(12) United States Patent
Tanabe et al.

(10) Patent No.: US 8,410,649 B2
(45) Date of Patent: Apr. 2, 2013

(54) ELECTRIC MOTOR, ELECTRIC MOTOR UNIT, BLOWER, AND ELECTRIC DEVICE

(75) Inventors: Yuichi Tanabe, Osaka (JP); Toshifumi Tsutsumi, Osaka (JP); Shinsuke Kimura, Kyoto (JP); Hirosi Mukaide, Osaka (JP)

(73) Assignee: Panasonic Corporation, Osaka (JP)

( * ) Notice: Subject to any disclaimer, the term of this patent is extended or adjusted under 35 U.S.C. 154(b) by 316 days.

(21) Appl. No.: 13/011,150

(22) Filed: Jan. 21, 2011

(65) Prior Publication Data
US 2011/0215658 A1 Sep. 8, 2011

(30) Foreign Application Priority Data

Mar. 2, 2010 (JP) ................................. 2010-045152

(51) Int. Cl.
*H02K 11/00* (2006.01)
(52) U.S. Cl. ......................................................... 310/71
(58) Field of Classification Search .................... 310/71; 439/620.06, 620.12, 620.16
See application file for complete search history.

(56) References Cited

U.S. PATENT DOCUMENTS

| | | | | |
|---|---|---|---|---|
| 4,724,346 A | * | 2/1988 | Klein et al. | 310/67 R |
| 5,057,732 A | * | 10/1991 | Fukaya | 310/208 |
| 5,073,735 A | * | 12/1991 | Takagi | 310/71 |
| 6,291,914 B1 | * | 9/2001 | Mukaiyama | 310/68 B |
| 6,528,915 B1 | * | 3/2003 | Moskob | 310/71 |
| 6,707,185 B2 | * | 3/2004 | Akutsu et al. | 310/71 |
| 6,710,475 B2 | * | 3/2004 | Nishida et al. | 310/254.1 |
| 7,757,929 B2 | * | 7/2010 | Ice et al. | 228/180.21 |

FOREIGN PATENT DOCUMENTS

| | | |
|---|---|---|
| JP | 08-064275 A | 3/1996 |
| JP | 2003-319615 A | 11/2003 |

* cited by examiner

*Primary Examiner* — Dang Le
(74) *Attorney, Agent, or Firm* — RatnerPrestia

(57) ABSTRACT

A power supply connecting member is configured by a housing of the power supply connecting member molded with a terminal of the power supply connecting member by a resin. The terminal of the power supply connecting member has three bent portions, two bent portions are perpendicular to an axial direction before the terminal is bent, and the remaining bent portion is parallel to the axial direction before the terminal is bent. A distal end on a bending side of the terminal of the power supply connecting member is inserted into the power supply connecting member housing to configure the power supply connecting member. An output shaft support portion unit is configured such that a bearing to hold a rotor and an elastic member (spring for example) to hold the bearing are stored in a bottom cover (lower cover) having a recessed portion and a lid cover (upper cover) is press-fitted.

28 Claims, 19 Drawing Sheets

ELECTRIC MOTOR, ELECTRIC MOTOR UNIT, BLOWER, AND ELECTRIC DEVICE

TECHNICAL FIELD

The present invention relates to an electric motor mounted in an electric device, for example, a refrigerator to drive a blowing fan (rotor blades) for the electric device.

BACKGROUND ART

A conventional electric motor, as shown in FIG. 21, includes stator 101a, rotor 102a, bearing unit 103a to hold rotor 102a, and power supply connecting member (connector) 104a to supply power from an external power supply to the electric motor. FIG. 22 shows a conventional power supply connecting member (connector), and FIG. 23 shows terminal 105a of the conventional power supply connecting member configuring a power supply connecting member.

Power supply connecting member 104a, as shown in FIG. 22, includes power supply connecting member housing 106a molded by a resin together with terminal 105a of the power supply connecting member. Terminal 105a of the power supply connecting member, as shown in FIG. 22, has one bent portion one end of which is inserted into power supply connecting member housing 106a.

FIG. 24 shows a conventional circuit board assembly to supply current to a winding. Power supply connecting member 104a is held and connected such that terminals 105a of the power supply connecting member are inserted into through holes formed in circuit wiring board (printed board) 107a and applied with solder 108a from an opposite side of terminal insertion (for example, refer to Patent Literature 1).

FIG. 25 also shows a conventional electric motor. The conventional electric motor, as shown in FIG. 25, includes stator 101, rotor 102, and output shaft support portion unit 103 to hold rotor 102. FIG. 26 shows details of output shaft support portion unit 103.

As shown in FIG. 26, output shaft support portion unit 103 is configured such that bearing 112 to hold rotor 102 and elastic member (spring) 113 to hold bearing 112 are placed on bottom cover 111 and lid cover 114 is press-fitted.

When the electric motor is to be attached to the electric device, projection 115 formed on bottom cover 111 is held to attach the electric motor (for example, refer to Patent Literature 2).

When a conventional power supply connecting member is mounted, the power supply connecting member is allowed to be soldered from only an opposite side of a terminal-insertion side. In particular, when the power supply connecting member is to be mounted on a board having one surface to which a circuit wiring (pattern) is applied, the power supply connecting member is allowed to be arranged on an opposite side of the circuit wiring to limit the structure. When the electric motor is attached to the electric device by holding a bearing of the electric motor, structures such as a size and a shape of a projection to hold the electric motor are limited in a case in which the bearing unit is molded by drawing compound. A structure of an electric motor holding unit shape on the electric device side is also limited.

[Patent Literature]
[PTL 1]
Unexamined Japanese Patent Publication No. H8-64275
[PTL 2]
Unexamined Japanese Patent Publication No. 2003-319615

SUMMARY OF INVENTION

The present invention provides an electric motor in which a stator, a power supply connecting member, and a control unit component which controls a winding of the stator are attached to a circuit wiring board, and the circuit wiring board, the stator, the power supply connecting member, and the control unit component are molded by a molding material, including:

the stator including a stator core having a plurality of teeth arranged in a substantially radial pattern, a yoke which connects the teeth on a peripheral portion, teeth end broad portions formed on the end of the teeth, a slot open formed between the adjacent teeth end broad portions, and a winding wound on the teeth through an insulator; and a rotor rotatably held facing an inner circumference of the stator through a small gap and having at least a permanent magnet magnetized to a plurality of poles, wherein the power supply connecting member has a housing unit and a terminal having three bent portions, two bent portions of the bent portions extend in a direction perpendicular to a terminal axis direction of the terminal before being bent, a remaining bent portion extends in parallel to the terminal axis direction of terminal before being bent, a through hole is formed in the circuit wiring board, a distal end of the terminal of the power supply connecting member is inserted into the through hole, a terminal portion parallel to the circuit wiring board is soldered to arrange the power supply connecting member on a circuit wiring surface side of the circuit wiring board to only one surface of which has circuit wiring.

The configuration can cause the power supply connecting member to be arranged on the circuit wiring surface, and the miniaturization of an electric motor and resource saving can be achieved. In particular, when a board having one surface to which a circuit wiring is applied is used, an industrial effect such as a cost reduction of the electric device can also be expected.

Further, the present invention provides an electric motor in which a stator, a connection-line-attached connector of a power supply connecting member, and a control unit component which controls a winding of the stator are attached to a circuit wiring board, and the circuit wiring board, the stator, the connection-line-attached connector of the power supply connecting member, and the control unit component are molded by a molding material, including:

the stator including the stator core having a plurality of teeth arranged in a substantially radial pattern, a yoke which connects the teeth on a peripheral portion, teeth end broad portions formed on the end of the teeth, a stator core having a slot open formed between the adjacent teeth end broad portions, and a winding wound on the teeth through an insulator; and a rotor rotatably held facing an inner circumference of the stator through a small gap and having at least a permanent magnet magnetized to a plurality of poles, wherein the connection-line-attached connector is configured such that a lead line is connected to caulking terminal portion on one end side of a terminal of the connection-line-attached connector and a connection portion between the caulking terminal portion and the lead line is integrally molded by resin, the terminal has three step portions on the other end side, two step portions of the step portions extend in a direction perpendicular to a terminal direction of the caulking terminal portion, a remaining step portion extends in parallel to the terminal direction of the caulking terminal portion, a distal end portion of the caulking terminal portion is inserted in a through hole formed in the circuit wiring board, a terminal portion parallel to the circuit wiring board is soldered to arrange the connection-line-attached connector on a circuit wiring surface side of the circuit wiring board to only one surface of which has circuit wiring.

The configuration can cause the power supply connecting member to be arranged on the circuit wiring surface, and the miniaturization of an electric motor and resource saving can be achieved. In particular, when a board having one surface to which a circuit wiring is applied is used, an industrial effect such as a cost reduction of the electric device can also be expected.

DETAILED DESCRIPTION OF EMBODIMENTS

Embodiments for carrying out the present invention will be described below with reference to the accompanying drawings.

First Embodiment

Figure 1:
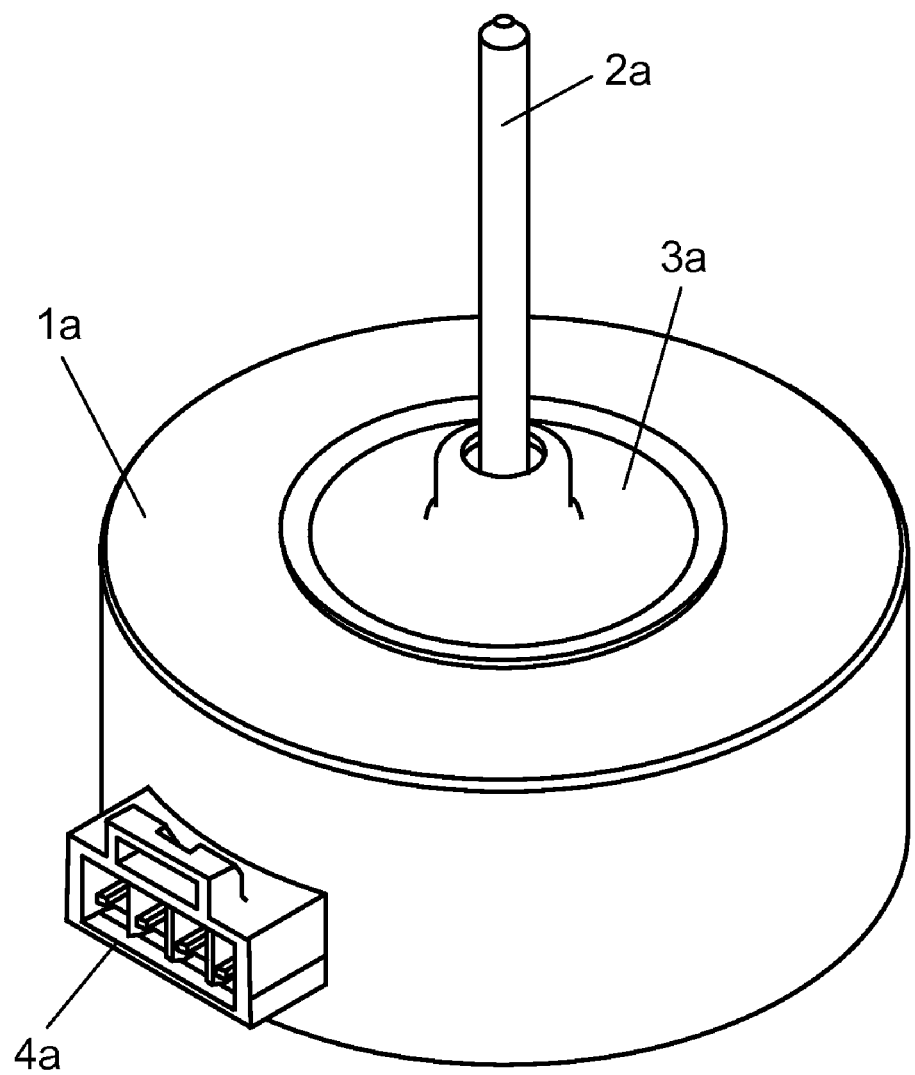
FIG. 1 is an appearance view of an electric motor according to Embodiment 1 of the present invention.
Figure 2:
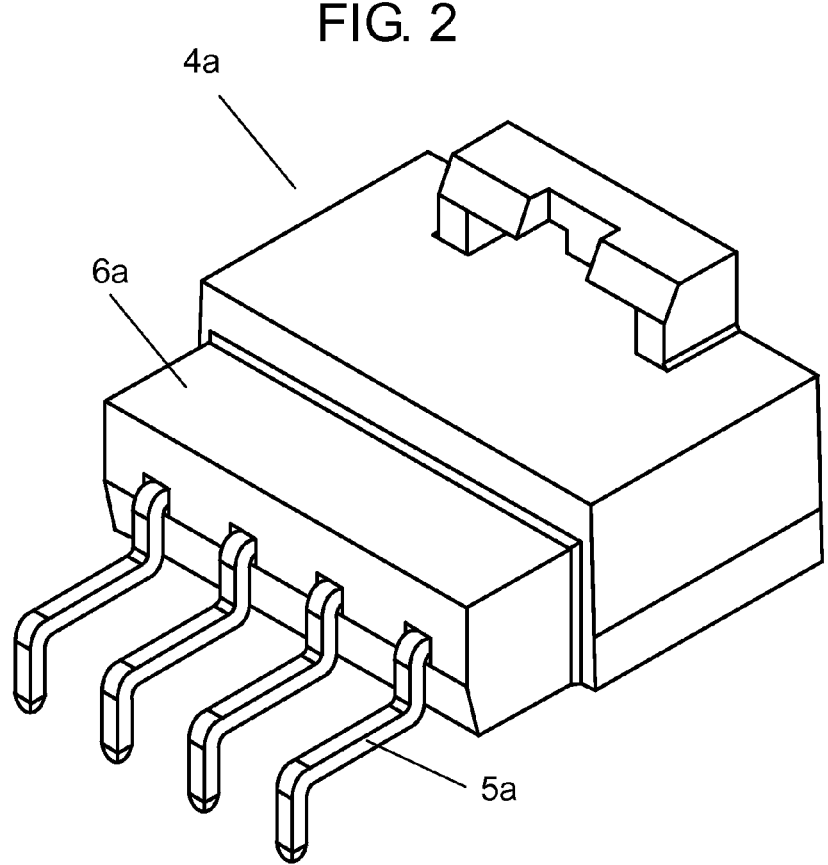
FIG. 2 is an appearance view of a power supply connecting member (connector) part according to Embodiment 1 of the present invention.
Figure 3:
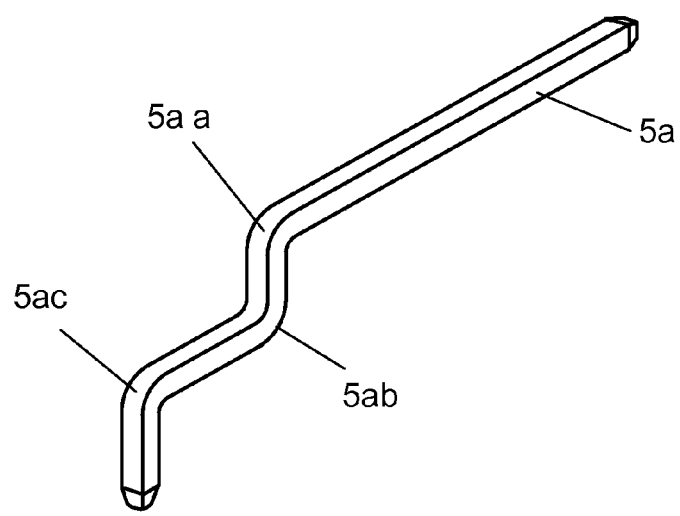
FIG. 3 is an appearance view of a terminal of the power supply connecting member according to Embodiment 1 of the present invention.

FIG. 1 shows an electric motor to which a first embodiment of the present invention is applied. The electric motor according to the embodiment, as shown in FIG. 1, includes stator 1a, rotor 2a, bearing unit 3a to hold rotor 2a, and power supply connecting member (connector) 4a to supply power from an external power supply to the electric motor. FIG. 2 shows the power supply connecting member, and FIG. 3 shows terminal 5a of the power supply connecting member.

Figure 4:
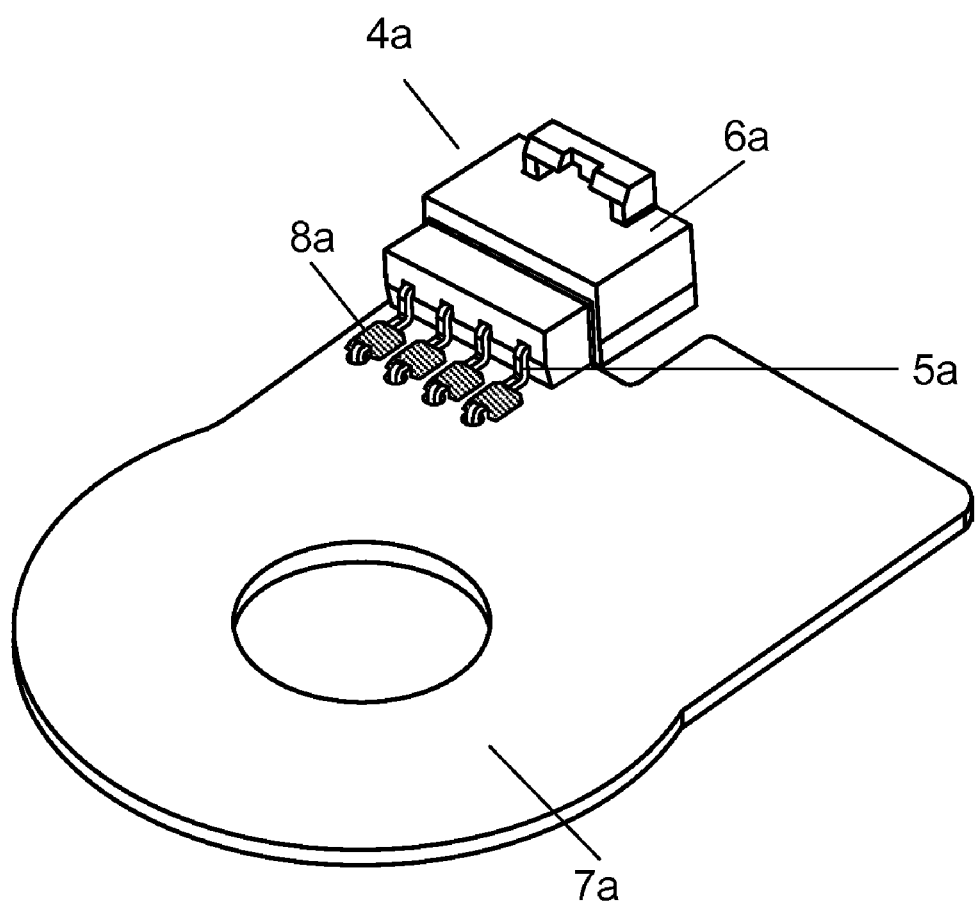
FIG. 4 is an appearance view of a board assembly according to Embodiment 1 of the present invention.

As shown in FIG. 2, power supply connecting member 4a is configured by terminal 5a of the power supply connecting member and power supply connecting member housing 6a molded by a resin. Terminal 5a of the power supply connecting member, as shown in FIG. 3, has three bent portions 5aa, 5ab, and 5ac. Two bent portions 5aa and 5ac extend in a direction perpendicular to a terminal axis direction of terminal 5a before being bent. Remaining bent portion 5ab extends in parallel to the terminal axis direction of terminal 5a before being bent. Power supply connecting member 4a is configured such that a distal end on a bending side of terminal 5a of power supply connecting member 4a is inserted into power supply connecting member housing 6a. FIG. 4 shows a board assembly to which the first embodiment of the present invention in which power supply connecting member 4a is mounted on circuit wiring board (printed board) 7a is applied.

As shown in FIG. 4, when power supply connecting member 4a is to be mounted on circuit wiring board 7a, after an electronic component is mounted on circuit wiring board 7a by dipping or reflowing, the distal ends of terminals 5a of power supply connecting member 4a are inserted into through holes formed in circuit wiring board 7a to position power supply connecting member 4a. A part of terminal 5a of power supply connecting member 4a which is parallel to circuit wiring board 7a is applied with solder 8a by means of manual soldering or automatic soldering, so that power supply connecting member 4a can be accurately arranged on the same surface as the soldered surface between circuit wiring board 7a and terminal 5a of power supply connecting member 4a.

The terminal 5a can also be soldered, on a fixed surface side of power supply connecting member 4a, to circuit wiring board 7a to both the surfaces of which circuit wiring is applied.

The terminal 5a of power supply connecting member 4a, a terminal having a circular sectional shape can also be used. However, a terminal having a polygonal sectional shape is preferably used to accurately perform a bending process.

Second Embodiment

Figure 5:
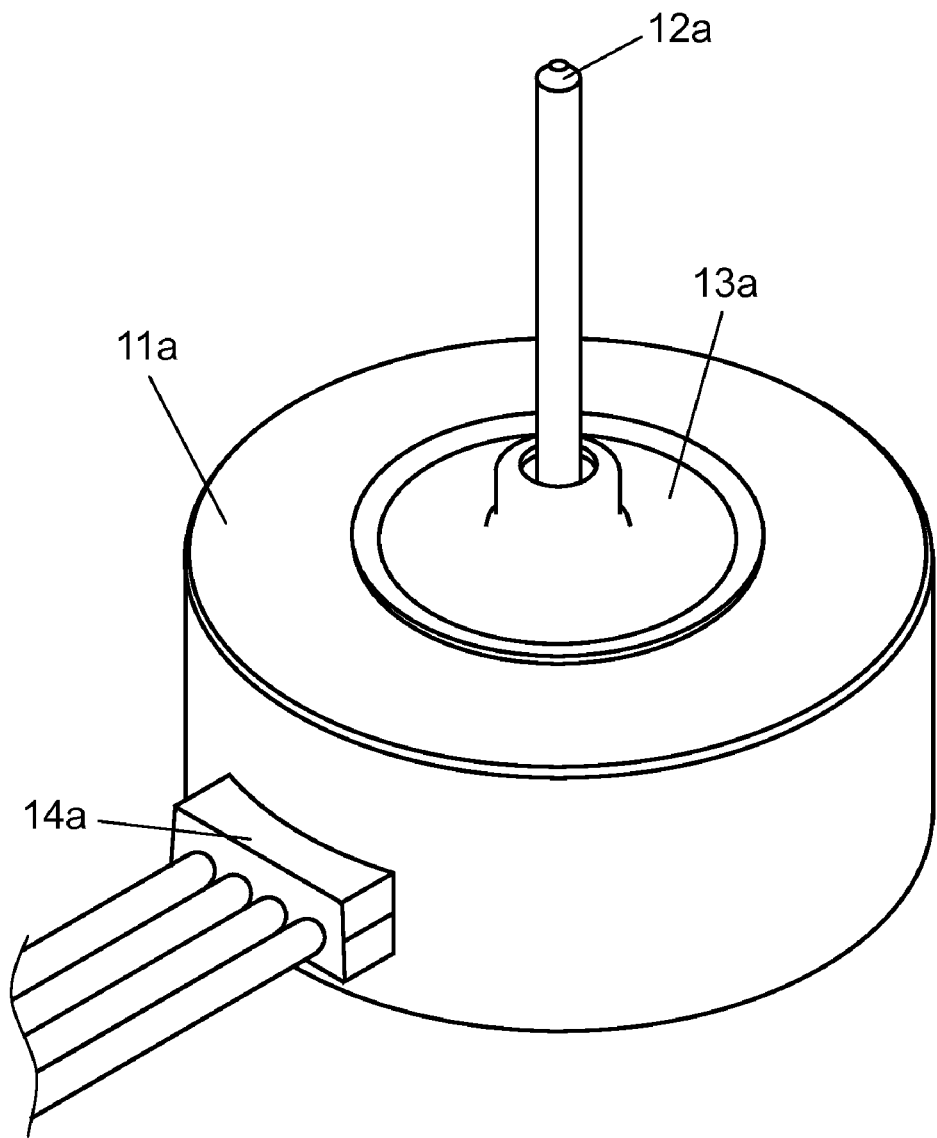
FIG. 5 is an appearance view of an electric motor according to Embodiment 2 of the present invention.
Figure 6:
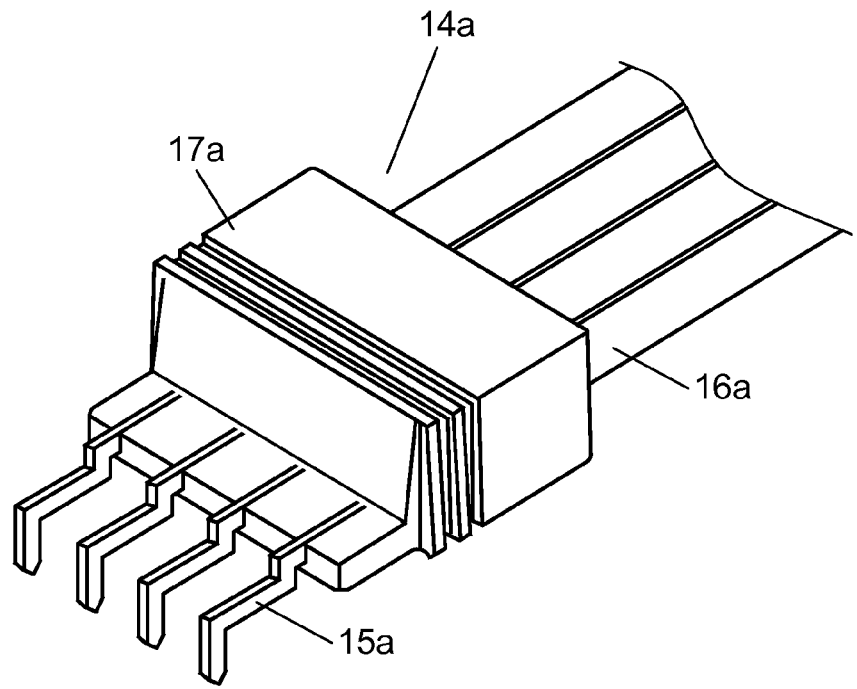
FIG. 6 is an appearance view of a power supply connecting member part according to Embodiment 2 of the present invention.
Figure 7:
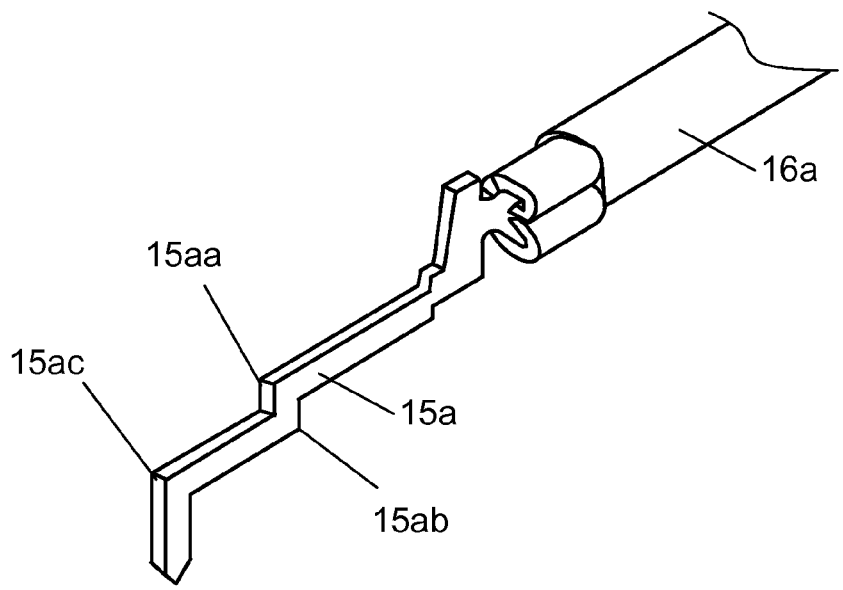
FIG. 7 is an appearance view of a terminal of the power supply connecting member according to Embodiment 2 of the present invention.

FIG. 5 shows an electric motor to which a second embodiment of the present invention is applied. The electric motor according to the embodiment includes stator 11a, rotor 12a, bearing unit 13a to hold rotor 12a, and connection-line-attached connector 14a to supply power from an external power supply to the electric motor. FIG. 6 shows connection-line-attached connector 14a, and FIG. 7 shows caulking terminal 15a and lead line 16a.

Figure 8:
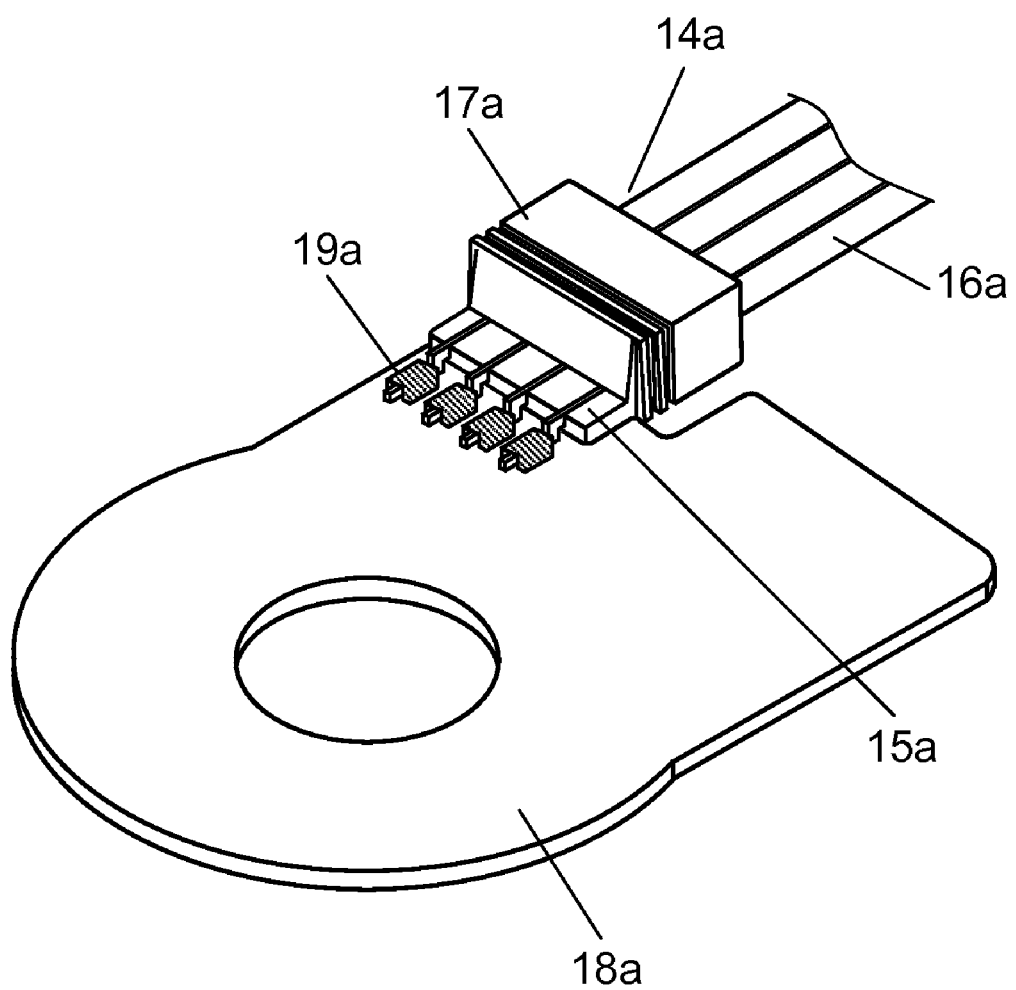
FIG. 8 is an appearance view of a board assembly according to Embodiment 2 of the present invention.

As shown in FIG. 6, connection-line-attached connector 14a is configured such that lead lines 16a are connected to caulking terminals 15a and lead lines 16a caulked to caulking terminals 15a are arranged in line and integrally molded by resin 17a. In this case, caulking terminal 15a has one end the structure of which caulks lead line 16a, and the other end has three step portions 15aa, 15ab, and 15ac. Two step portions 15aa and 15ac extend in a direction perpendicular to a terminal direction of the caulking portion, and remaining step portion 15ab extends in parallel to the terminal direction of caulking terminal 15a. FIG. 8 shows an application of the embodiment and a board assembly in which connection-line-attached connector 14a is mounted on circuit wiring board (printed board) 18a.

As shown in FIG. 8, when connection-line-attached connector 14a is to be mounted on circuit wiring board 18a, after an electronic component is mounted on circuit wiring board 18a by dipping or reflowing, the distal ends of caulking terminals 15a are inserted into through holes formed in circuit wiring board 18a to position connection-line-attached connector 14a. A part of caulking terminal 15a which is parallel to circuit wiring board 18a is applied with solder 19a by means of manual soldering or automatic soldering, so that connection-line-attached connector 14a can be accurately arranged on the same surface as the soldered surface between circuit wiring board 18a and caulking terminal 15a.

Connection-line-attached connector 14a may be integrally molded by resin 17a or may be configured to clamp lead lines with a resin cover or the like.

Third Embodiment

Figure 9:
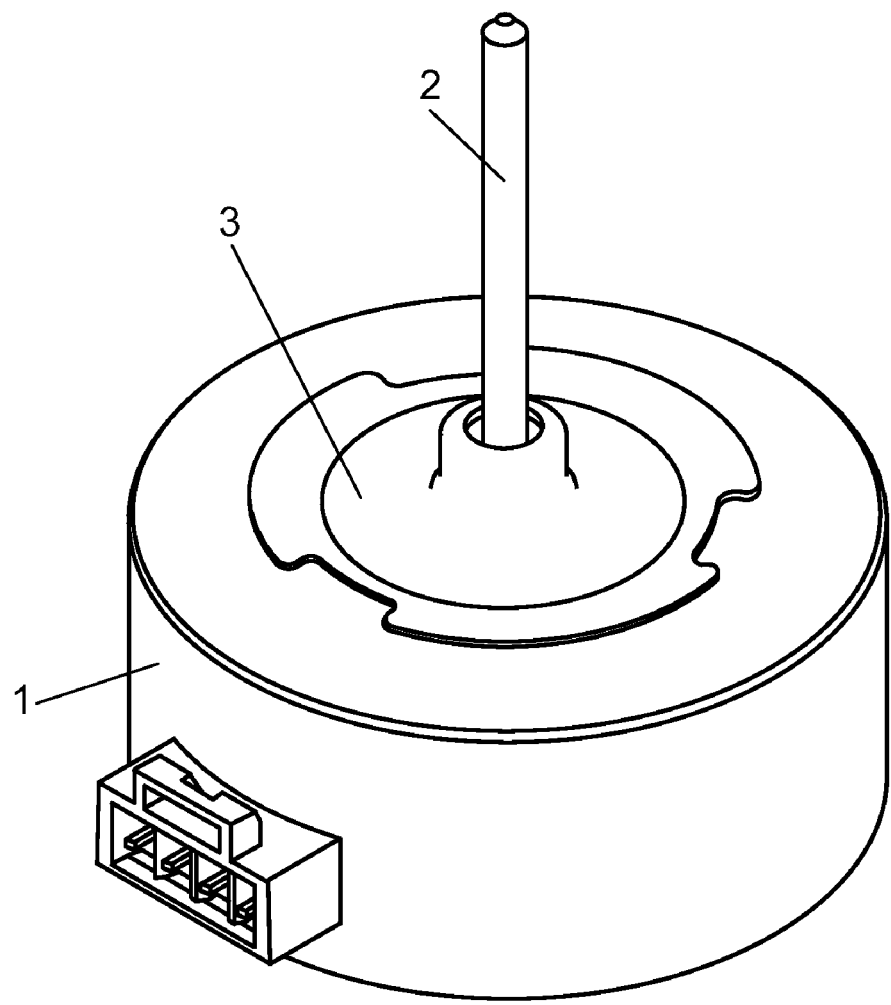
FIG. 9 is an appearance view of an electric motor according to Embodiment 3 of the present invention.
Figure 10:
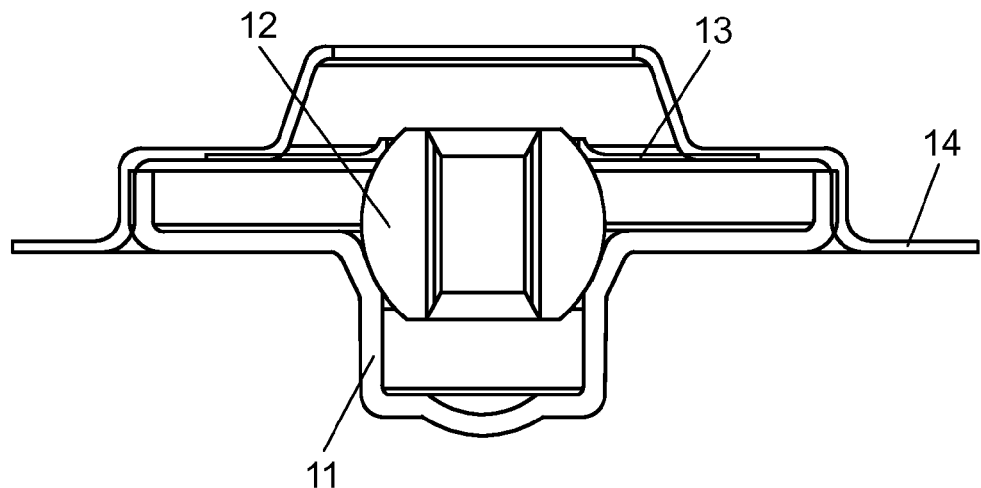
FIG. 10 is a sectional view of an output shaft support portion unit in Embodiment 3 of the present invention.
Figure 11:
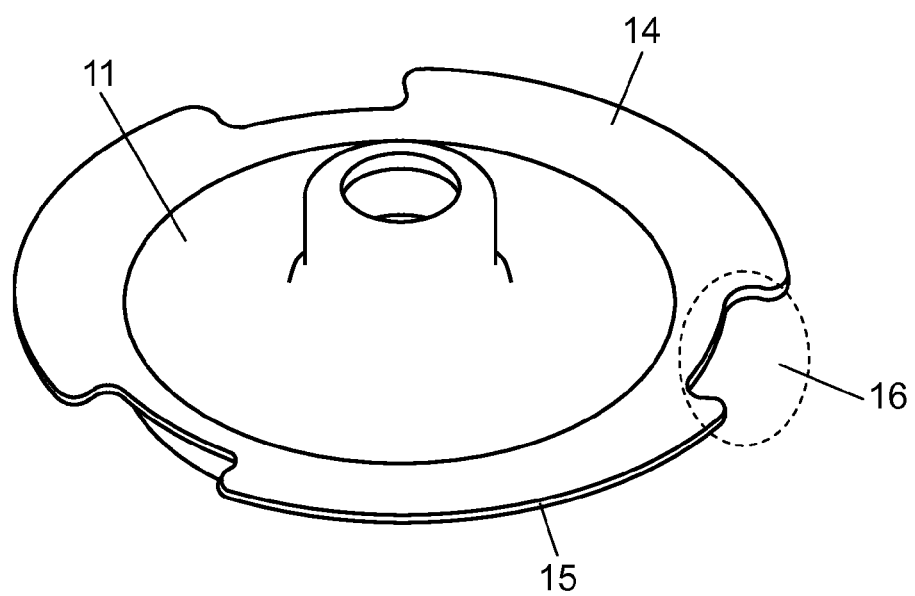
FIG. 11 is an appearance view of the output shaft support portion unit in Embodiment 3 of the present invention.

FIG. 9 shows electric motor to which a third embodiment of the present invention is applied. The electric motor according to the embodiment, as shown in FIG. 9, includes stator 1, rotor 2, and an output shaft support portion unit (bearing unit) 3. FIGS. 10 and 11 show details of output shaft support portion unit 3.

As shown in FIG. 10, output shaft support portion unit 3 is configured such that bearing 12 to hold rotor 2 and elastic member (spring or the like) 13 to hold bearing 12 are stored in bottom cover (lower cover) 11 having a recessed portion and lid cover (upper cover) 14 is press-fitted in elastic member 13. More specifically, a fitted portion of bottom cover 11 covered with bearing 12 and elastic member 13 is press-fitted in lid cover 14. Lid cover 14 has a shape having an annular flange. However, the lid cover is not specified by the embodiment.

As shown in FIG. 11, flange portion 15 is formed on lid cover 14, and notch 16 is formed in flange portion 15. Since FIG. 11 is a perspective view, FIG. 11 shows the structure in FIG. 10 which is upside-down. For this reason, the vertical directions and upper and lower positions of bottom cover 11 and lid cover 14 in the drawing in FIG. 11 are different from each other. Similarly, the upper and lower positions of the bottom cover (lower cover) and the lid cover (upper cover) in the drawings in FIG. 13, FIG. 15, FIG. 16, and FIG. 18 whose descriptions will be given later are different from the vertical directions in the drawing in FIG. 11.

In the embodiment of the electric motor according to the present invention, resin molding is applied as an outer package of the electric motor. More specifically, stator 1 having a drive coil of an electric motor is fixed to a printed board, and a rectifying unit which makes an AC power supply into a DC power supply, a smoothing capacitor component, a control component, and a current fuse component are arranged in a part mounting space outside the stator on the printed board. The components are electrically connected to a printed circuit of the printed board and molded by a molding material such as unsaturated polyester to integrate the components with the printed board.

Figure 12:
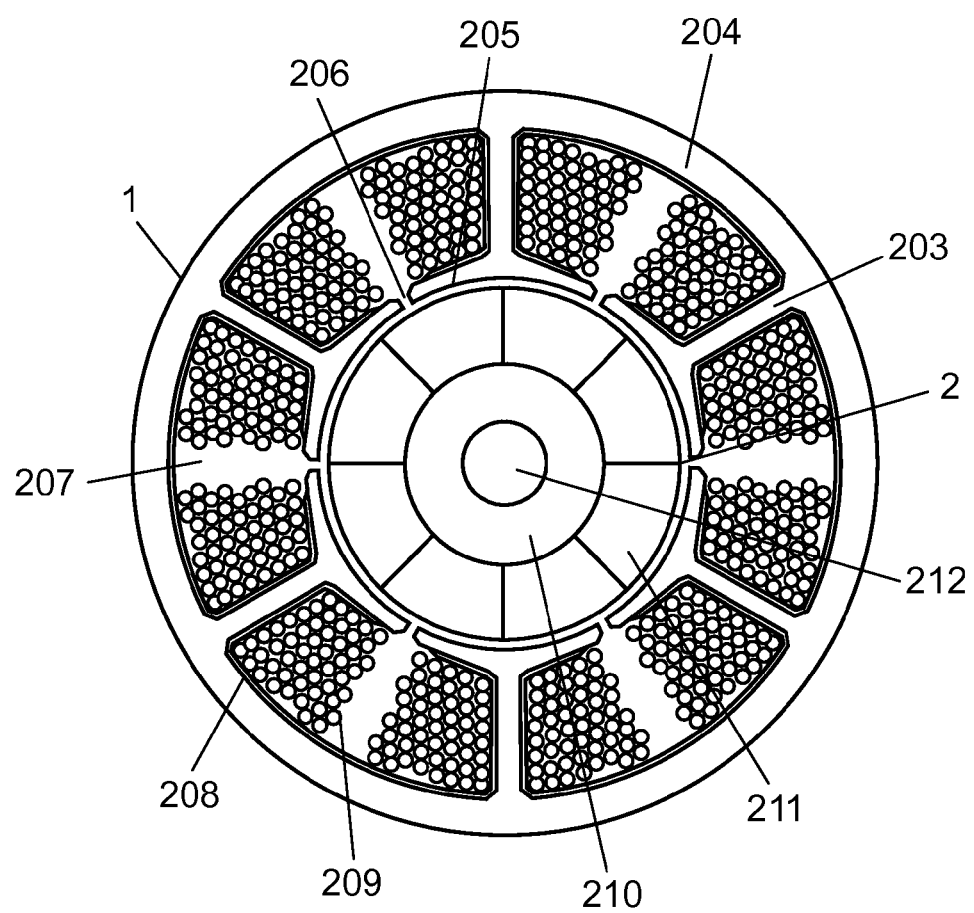
FIG. 12 is a plan view showing an internal configuration of an electric motor in Embodiment 3 of the present invention.

FIG. 12 is a plan view showing an internal configuration of the electric motor according to the embodiment. In the embodiment, a round concentrated winding motor includes stator 1 and rotor 2. FIG. 12 shows an example of an 8-pole-6-slot permanent magnet motor.

Stator 1 includes a plurality of teeth 203 substantially arranged in a radial pattern and substantially circular yoke 204 connecting the teeth to each other. An internal-diameter end of teeth 203 has teeth end broad portion 205 the width of which increases in a substantially rotating direction, slot open 206 is arranged between the adjacent teeth end broad portions, and slot 207 is arranged between the adjacent teeth. Winding 209 is applied to teeth 203 through insulator 208. As winding 209, a three-phase winding is applied.

Rotor 2 is rotatably held inside stator 1 coaxially with stator 1. FIG. 12 shows a rotor obtained by fixing ring-shaped permanent magnet 211 to rotor core 210. A shaft is inserted into shaft hole 212. Although not shown in FIG. 12, a stator core has plurality of teeth 203 arranged in a substantially radial pattern, a yoke 204 for connecting the teeth 204 on a peripheral portion, teeth end broad portions 205 formed on ends of the teeth 204, a slot open 206 formed between the adjacent teeth end broad portions 205.

Rotor 2 rotates about the shaft by a magnetic field generated by a current flowing through winding 209 applied to stator 1.

Rotor 2 of the electric motor is arranged in a hollow portion formed by stator 1, and rotor 2 is rotatably held by output shaft support portion unit 3 fitted in both end portions of the hollow portion. As a material of a conventional core line of winding 209 wound on teeth 203 through insulator 208, copper or a copper alloy is used. However, in terms of resource saving, depletion of resources, and economical efficiency, an alloy containing at least copper and aluminum or aluminum or an aluminum alloy containing a minute amount of impurity may be employed as the material of the core line of winding 209 wound on teeth 203 through insulator 208.

Fourth Embodiment

Figure 13:
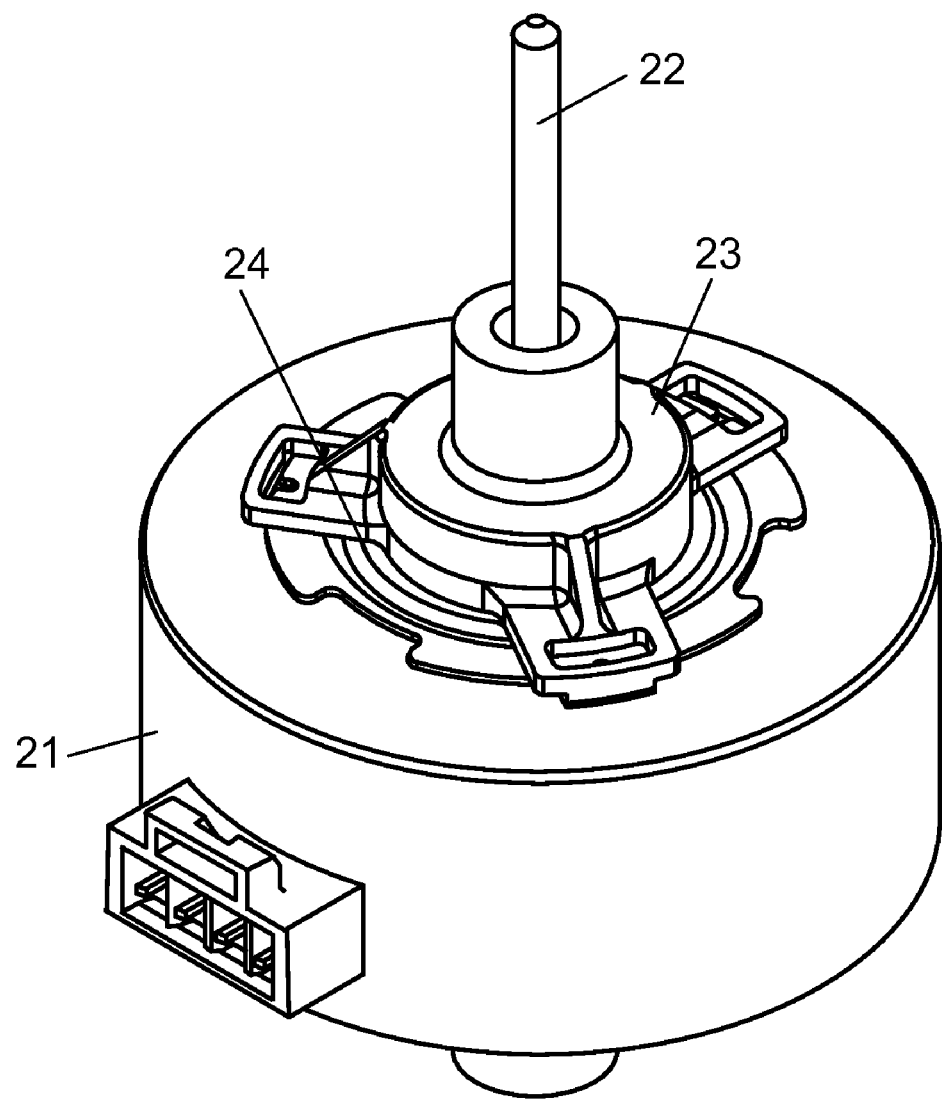
FIG. 13 is an appearance view of an electric motor in Embodiment 4 of the present invention.
Figure 14:
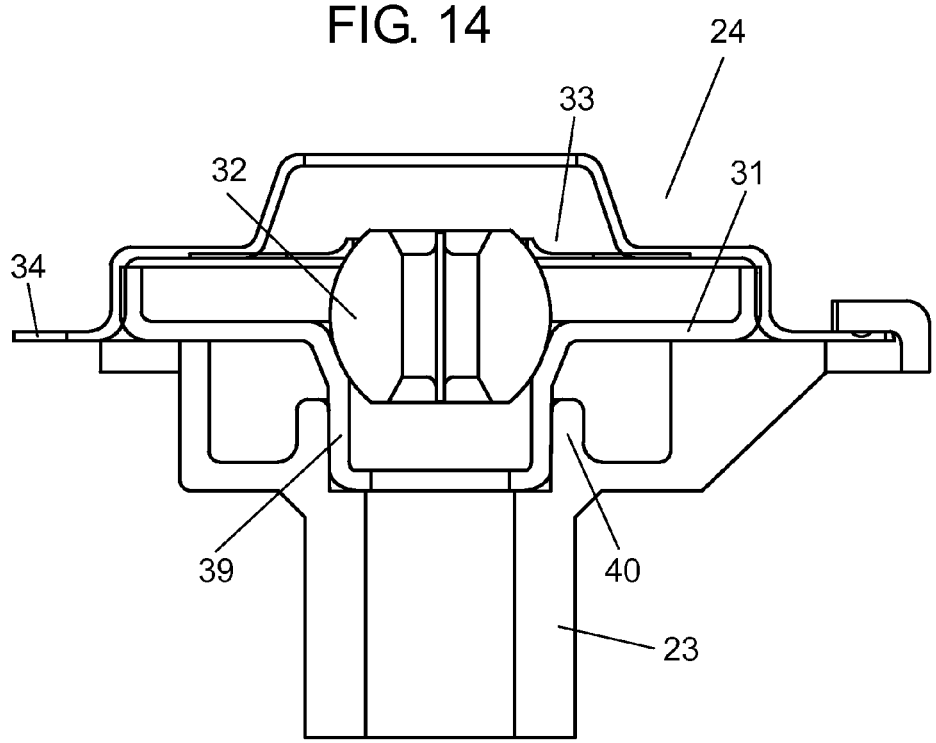
FIG. 14 is a sectional view of an output shaft support portion unit in Embodiment 4 of the present invention.
Figure 15:
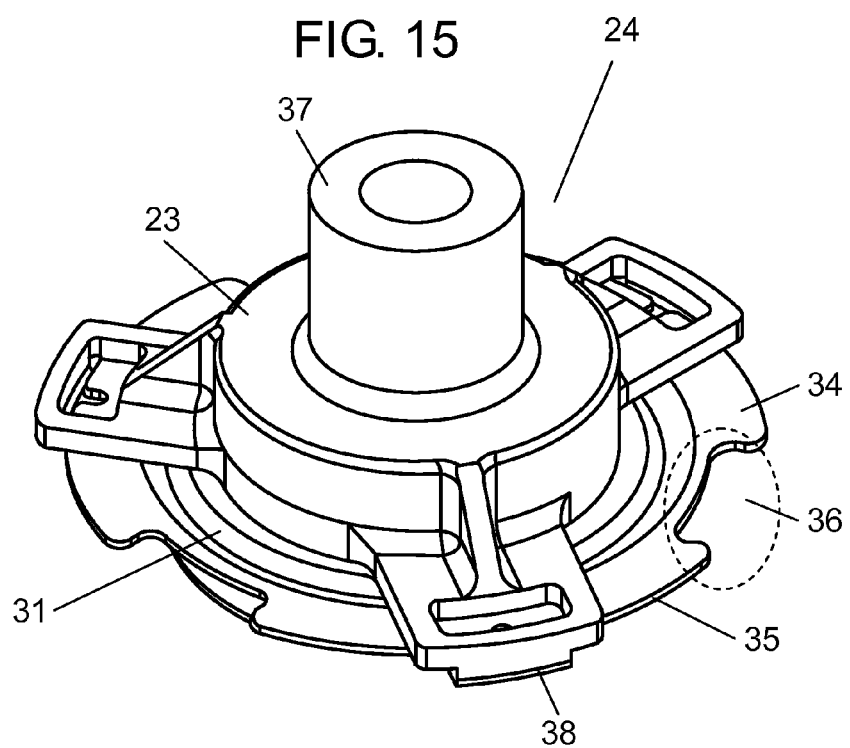
FIG. 15 is an appearance view of the output shaft support portion unit in Embodiment 4 of the present invention.

FIG. 13 shows an electric motor to which a fourth embodiment of the present invention is applied. The electric motor according to the embodiment, as shown in FIG. 13, includes stator 21, rotor 22, and output shaft support portion unit 24 to which electric motor attachment (holding cover) 23 is attached. FIGS. 14 and 15 show details of output shaft support portion unit 24.

As shown in FIG. 14, output shaft support portion unit 24 is configured such that bearing 32 to hold rotor 22 and elastic member (spring or the like) 33 to hold bearing 32 are placed on bottom cover 31 having a recessed portion and lid cover 34 is press-fitted in bottom cover 31.

As shown in FIG. 15, flange portion 35 is formed on lid cover 34, and notch 36 is formed in flange portion 35, hook 38 of electric motor attachment (holding cover) 23 having columnar projection 37 is inserted from notch 36, rotated, fixed, and fitted. As shown in FIG. 14, when projection 40 is formed on electric motor attachment 23 along projection 39 of bottom cover 31, a degree of coaxiality between electric motor attachment 23 and bottom cover 31 can be increased.

Output shaft support portion unit 24 having electric motor attachment 23 is press-fitted in stator 21 to make it possible to provide an electric motor depending on an electric motor holding unit shape on the electric device side.

A electric device attaching fixture is arranged on projections of the electric motor attachment through buffers inserted on the projections to configure an electric motor unit. Furthermore, rotor blades are attached from the distal end side of the output shaft of the electric motor unit to configure a blower. The blower is incorporated in a electric device such as a refrigerator.

Fifth Embodiment

Figure 16:
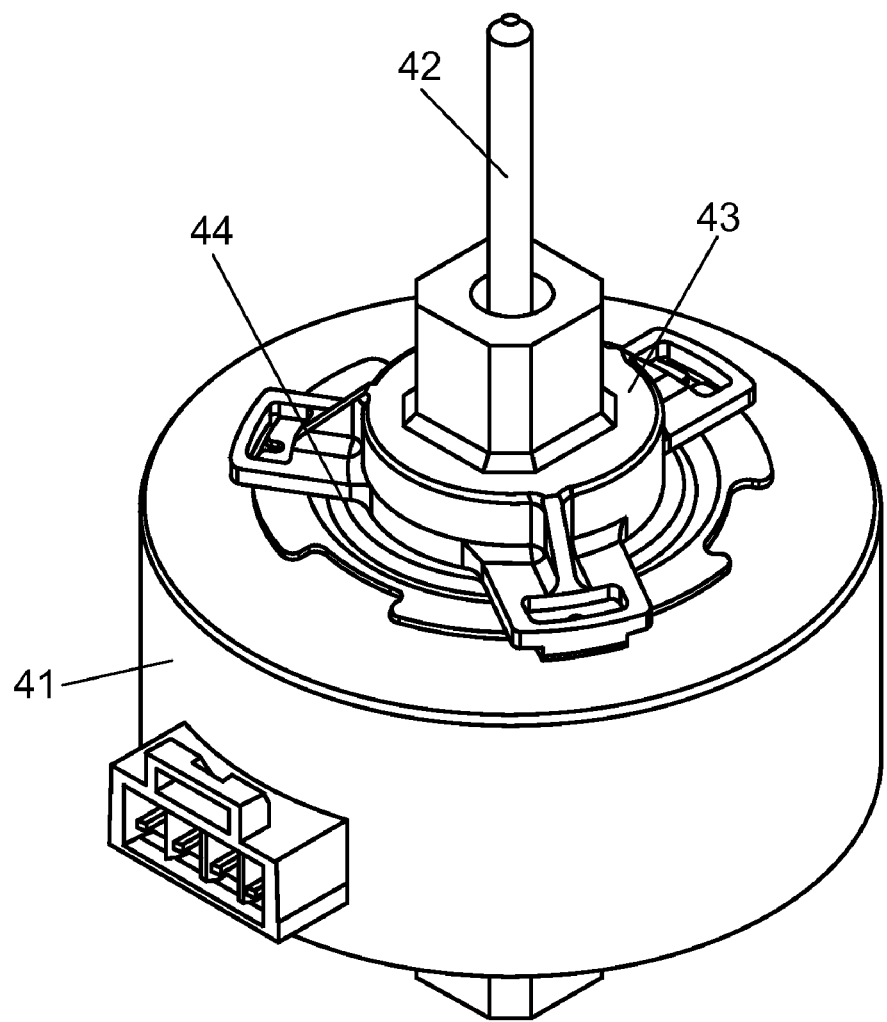
FIG. 16 is an appearance view of an electric motor in Embodiment 5 of the present invention.
Figure 17:
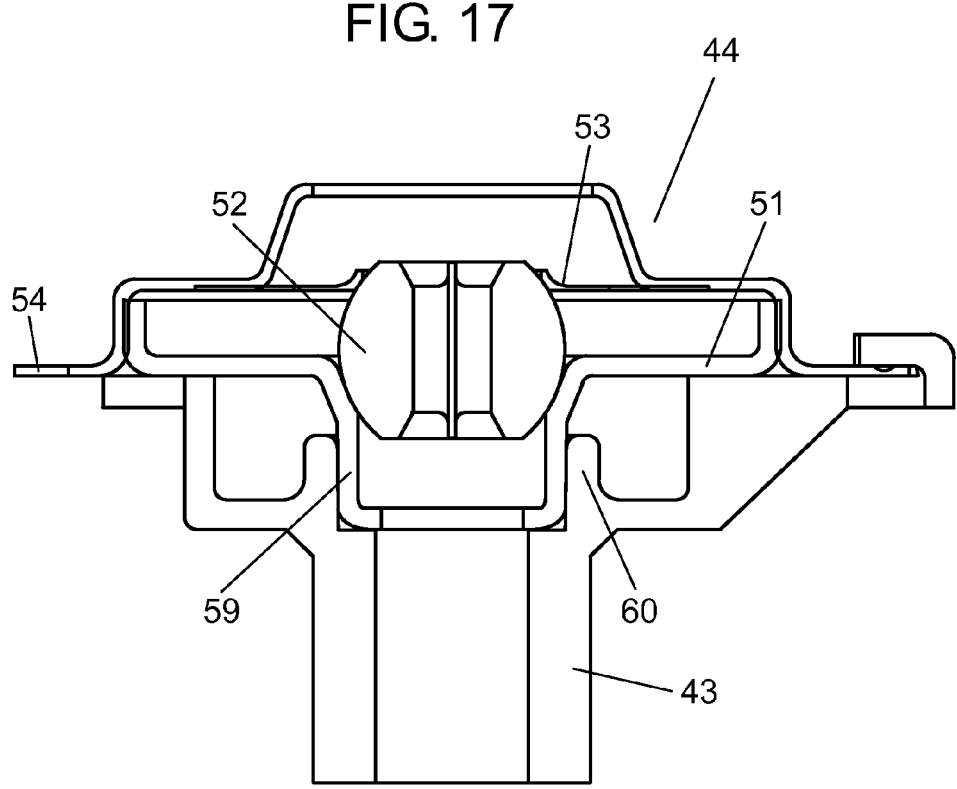
FIG. 17 is a sectional view of an output shaft support portion unit in Embodiment 5 of the present invention.
Figure 18:
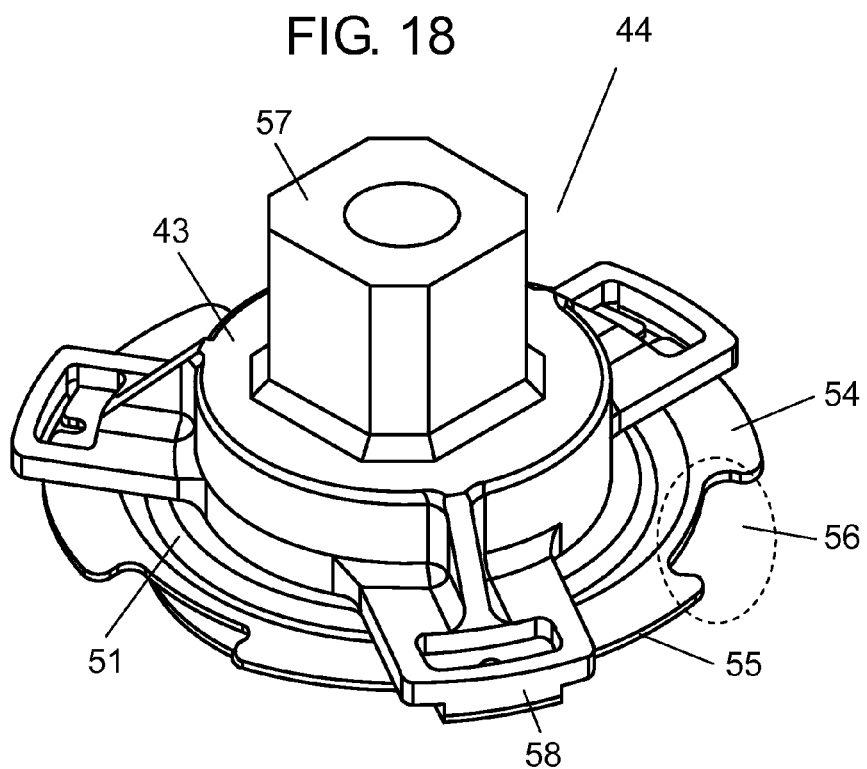
FIG. 18 is an appearance view of the output shaft support portion unit in Embodiment 5 of the present invention.

FIG. 16 shows an electric motor to which a fifth embodiment of the present invention is applied. The electric motor according to the embodiment, as shown in FIG. 16, includes stator 41, rotor 42, and output shaft support portion unit 44 to which electric motor attachment 43 is attached. FIGS. 17 and 18 show details of output shaft support portion unit 44.

As shown in FIG. 17, output shaft support portion unit 44 is configured such that bearing 52 to hold rotor 42 and elastic member (spring or the like) 53 to hold bearing 52 are placed on bottom cover 51 and lid cover 54 is press-fitted in bottom cover 51.

As shown in FIG. 18, flange portion 55 is formed on lid cover 54, and notch 56 is formed in flange portion 55. Hook 58 of electric motor attachment 43 having polygonal columnar projection 57 is inserted from notch 56, rotated, fixed, and fitted. As shown in FIG. 17, when projection 60 is formed on electric motor attachment 43 along projection 59 of bottom cover 51, a degree of coaxiality between electric motor attachment 43 and bottom cover 51 can be increased.

Output shaft support portion unit (bearing unit) 44 having electric motor attachment (holding cover) 43 is press-fitted in stator to make it possible to provide an electric motor depending on an electric motor holding unit shape on the electric device side. When the electric motor according to the embodiment is used as a fan motor for a refrigerator, the electric motor is useful for rationalization and power saving of electric device assembly steps.

Sixth Embodiment

Figure 19:
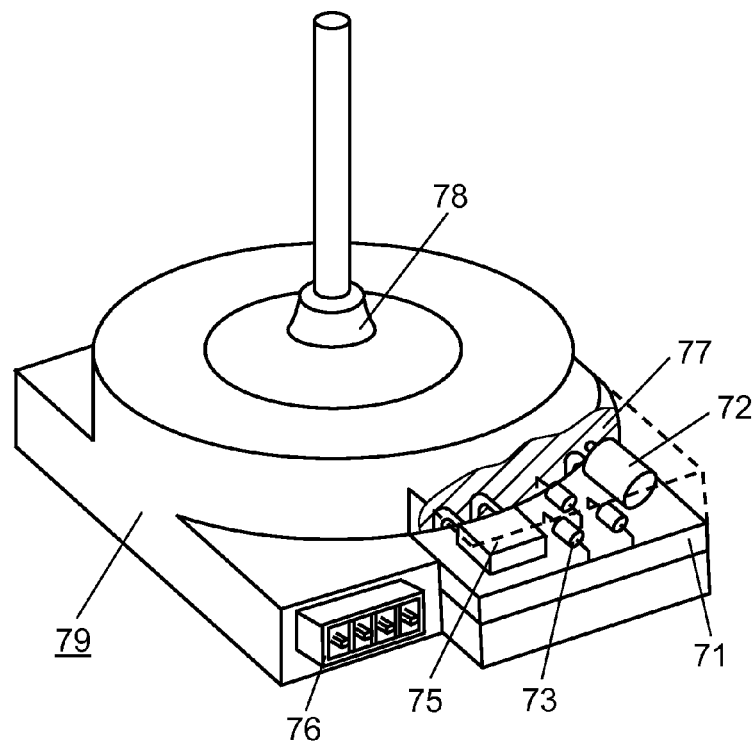
FIG. 19 is an appearance view of an electric motor in Embodiment 6 of the present invention.

FIG. 19 shows molding which is performed with a molding material in electric motor 79 according to the embodiment. A stator unit of the electric motor configured by a drive coil, a core, and the like of the electric motor is attached to circuit wiring board (printed board) 71. A control unit configured by electronic components 72 and 73 configuring a drive circuit, magnetic pole detecting element 74, drive element 75, and other circuit elements is attached to an outside space of the portion to which the electric motor is attached on circuit wiring board 71. Furthermore, power supply connecting member 76 is attached to an edge portion of circuit wiring board 71.

Figure 20:
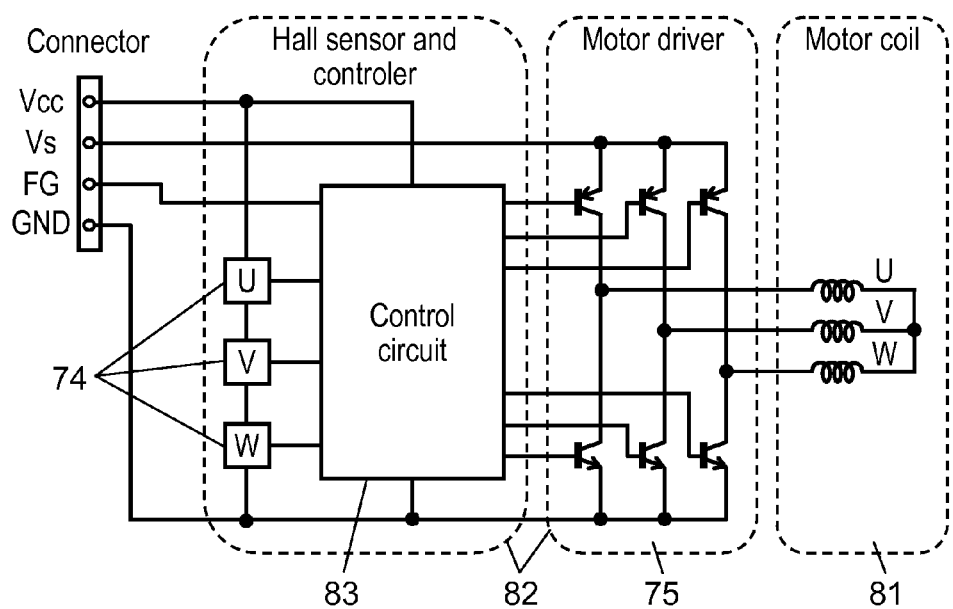
FIG. 20 is a circuit block diagram of the electric motor in Embodiment 6 of the present invention.
Figure 21:
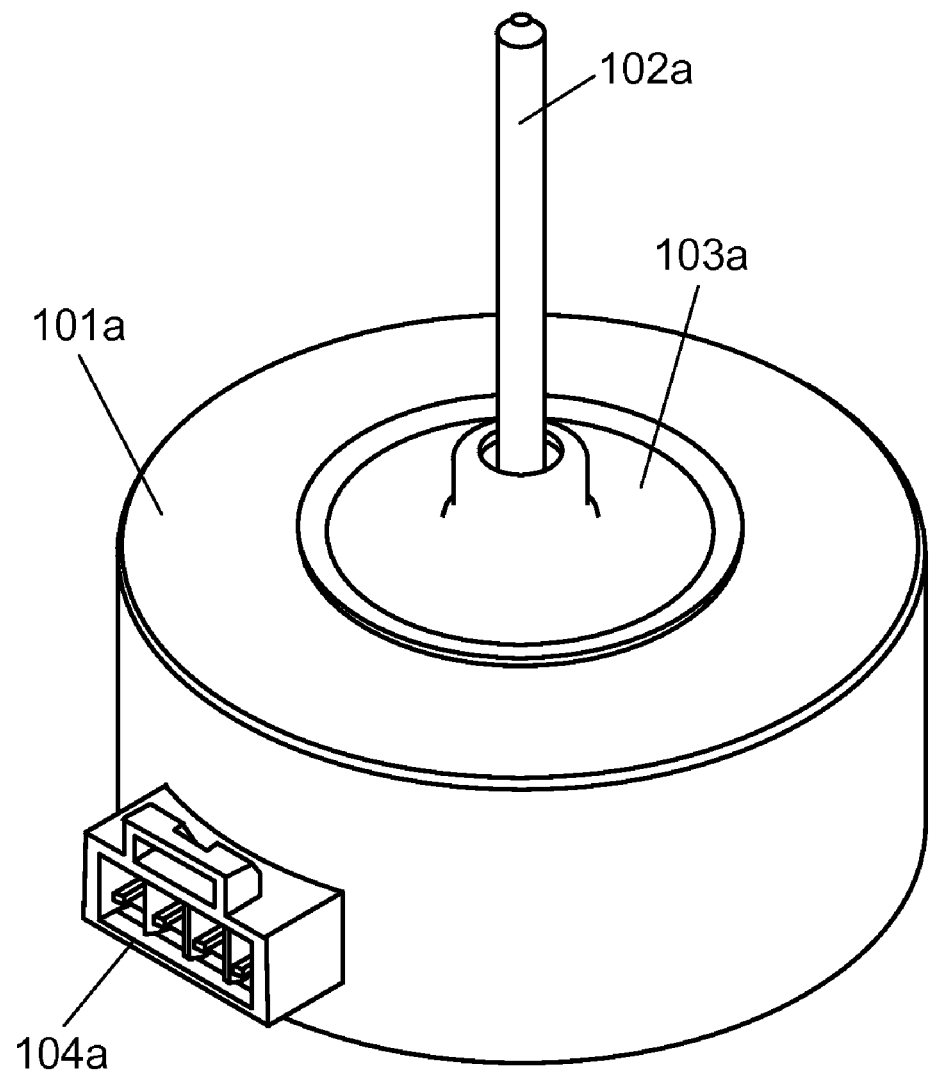
FIG. 21 is an appearance view of a conventional electric motor.
Figure 22:
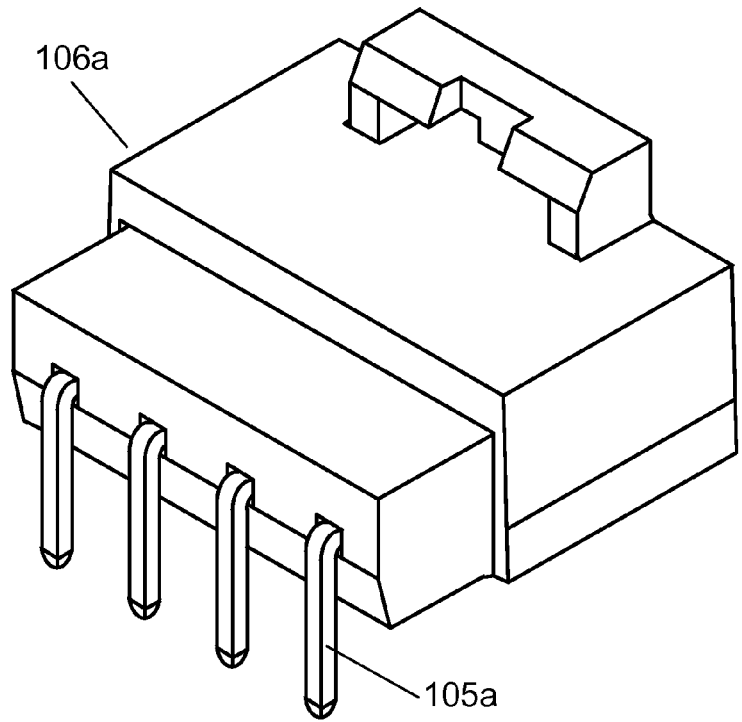
FIG. 22 is an appearance view of a conventional power supply connecting member (connector) part.
Figure 23:
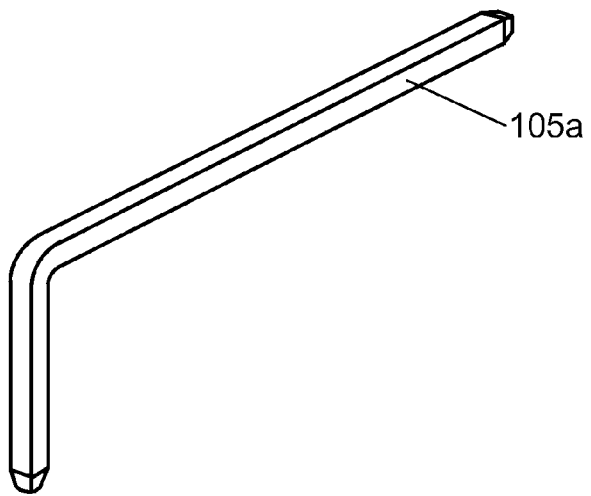
FIG. 23 is an appearance view of a terminal of the conventional power supply connecting member.
Figure 24:
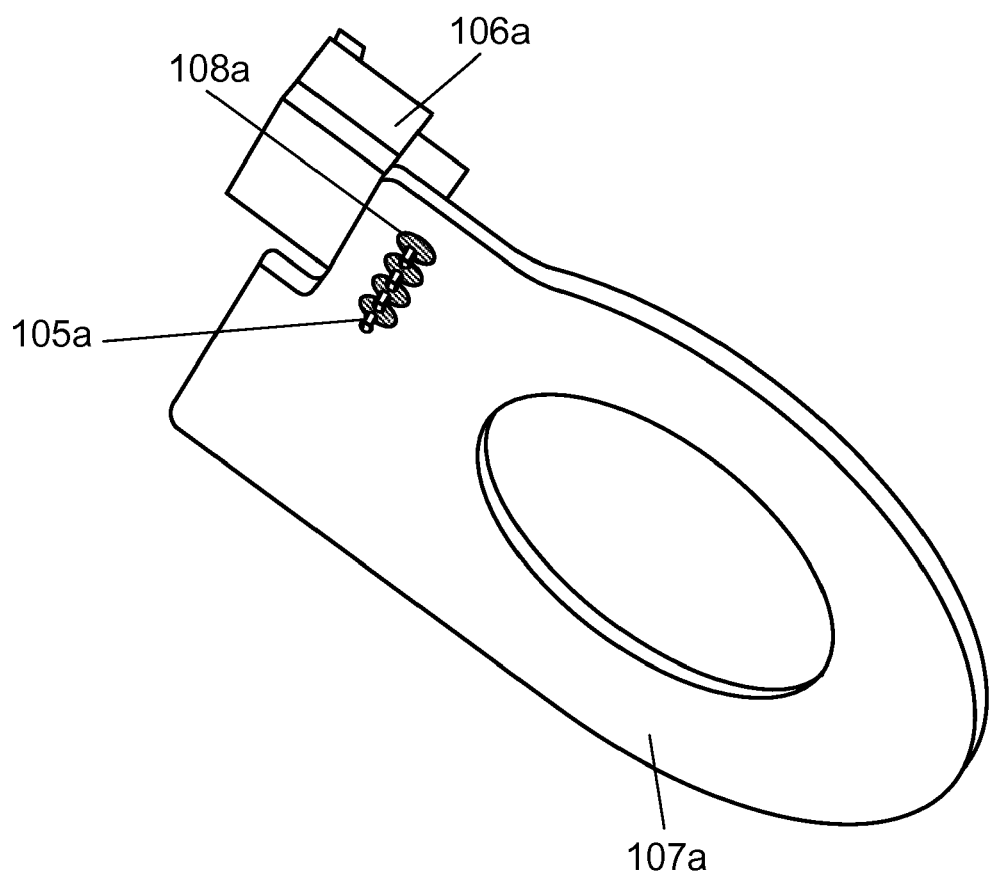
FIG. 24 is an appearance view of a conventional board assembly.
Figure 25:
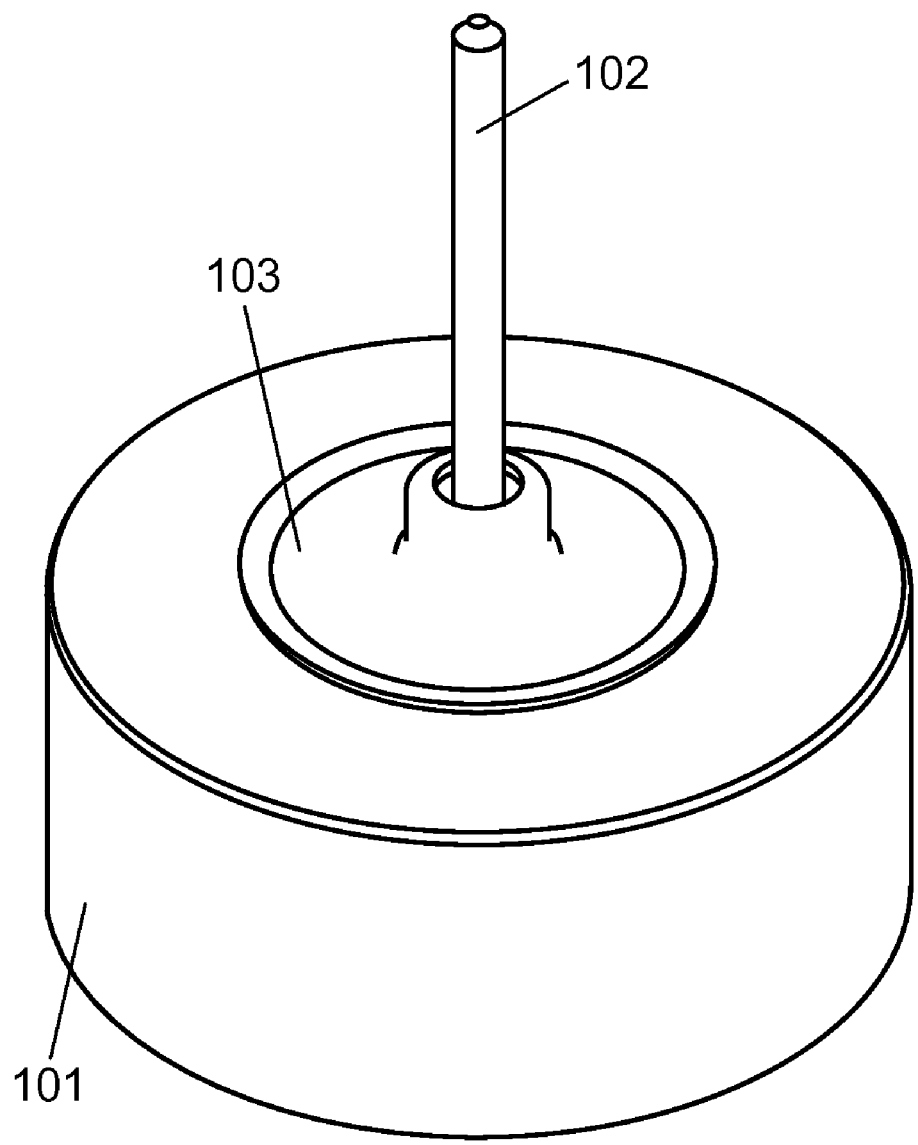
FIG. 25 is an appearance view of a conventional electric motor.
Figure 26:
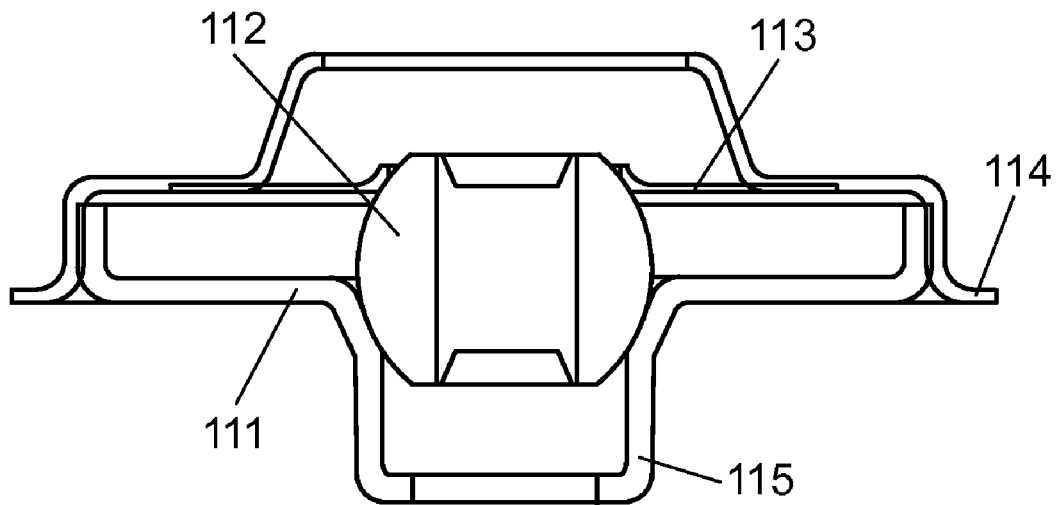
FIG. 26 is a sectional view of a conventional output shaft support portion unit (bearing unit).

FIG. 20 is a circuit block diagram of the electric motor according to the embodiment.

A DC power to be supplied is supplied to the circuit of the electric motor through power supply connecting member 76. On circuit wiring board 71, wires to supply DC power to drive coil 81 of the electric motor and wires to supply DC power to control unit 82 configured by magnetic pole detecting element 74, control element 83, drive element 75, and other circuit elements are arranged.

As shown in FIGS. 19 and 20, circuit wiring board 71, a stator unit of the electric motor configured by a drive coil, a core, and the like of the electric motor, power supply connecting member 76, and control unit 82 configured by electronic components 72 and 73, magnetic pole detecting element 74, control element 83, drive element 75, and other circuit elements are molded by molding material 77 such as unsaturated polyester and integrated. A rotor is arranged in a hollow portion formed by the stator, the rotor is rotatably held by bearing 78 fitted in an end portion of the hollow portion to configure the electric motor.

Molding material 77 is arbitrarily selected from an unsaturated polyester resin serving as a thermosetting resin, a phenol resin, an epoxy resin, and the like. Molding material 77 may also be arbitrarily selected from a polyethylene terephthalate resin serving as a thermoplastic resin, a polybutylene terephthalate resin, and the like.

The rotor in the present invention is configured by molding a plastic magnet material in a cylindrical shape and has a plurality of south and north poles on a periphery thereof. As the configuration of the rotor, not only the above configuration, but also another configuration may be selected.

The invention claimed is:

1. An electric motor in which a stator, a power supply connecting member, and a control unit component which controls a winding of the stator are attached to a circuit wiring board, and the circuit wiring board, the stator, the power supply connecting member, and the control unit component are molded by a molding material, comprising:
   the stator including
      a stator core having
         a plurality of teeth arranged in a substantially radial pattern,
         a yoke for connecting the teeth on a peripheral portion,
         teeth end broad portions formed on ends of the teeth,
         a slot open formed between the adjacent teeth end broad portions, and
      a winding wound on the teeth through an insulator; and
   a rotor rotatably held facing an inner circumference of the stator through a small gap and having at least a permanent magnet magnetized to a plurality of poles,
   wherein the power supply connecting member has a housing unit and a terminal having three bent portions, two bent portions of the bent portions extend in a direction perpendicular to a terminal axis direction of the terminal before being bent, a remaining bent portion extends in parallel to the terminal axis direction of terminal before being bent,
   a through hole is formed in the circuit wiring board, a distal end of the terminal of the power supply connecting member is inserted into the through hole,
   a terminal portion parallel to the circuit wiring board is soldered to arrange the power supply connecting member on a circuit wiring surface side of the circuit wiring board only one surface of which has circuit wiring.

2. The electric motor of claim 1,
   wherein a sectional shape of the terminal of the power supply connecting member is polygonal.

3. The electric motor of claim 2,
   wherein an attaching surface side of the power supply connecting member is soldered on the circuit wiring board both surfaces of which have circuit wiring.

4. The electric motor of claim 1,
   wherein an attaching surface side of the power supply connecting member is soldered on the circuit wiring board both surfaces of which have circuit wiring.

5. The electric motor of claim 1,
wherein the electric motor has an output shaft support portion unit which supports an output shaft of the electric motor and an electric motor attachment which is arranged and fitted on a projection direction side of the output shaft of the output shaft support portion unit and holds and fixes the electric motor, and the electric motor attachment has a through hole in which the output shaft is inserted, a configuration in which an inner wall surface of the through hole and the output shaft are separated from each other and are not in contact with each other, and a configuration in which a distal end of the output shaft projects from the through hole.

6. The electric motor of claim 5,
wherein the output shaft support portion unit to hold the rotor includes: a bottom cover; a bearing arranged on the bottom cover; an elastic member which presses the bearing; and a lid cover which covers the bottom cover, the bearing, and the elastic member and in which a fitted portion of the bottom cover is press-fitted.

7. The electric motor of claim 6,
wherein the lid cover of the output shaft support portion unit has a flange portion, the flange portion has a notch, an electric motor attachment is inserted from the notch, and the electric motor attachment is rotated about a virtual axis which is substantially centered at the output shaft, fitted, and fixed.

8. The electric motor of claim 6,
wherein the lid cover of the output shaft support portion unit has a flange portion, the flange portion has a notch, an electric motor holding attachment having a columnar projection is inserted from the notch, and the electric motor holding attachment is rotated about a virtual axis which is substantially centered at the output shaft, fitted, and fixed.

9. The electric motor of claim 6,
wherein the lid cover of the output shaft support portion unit has a flange portion, the flange portion has a notch, an electric motor holding attachment having a polygonal columnar projection is inserted from the notch, and the electric motor holding attachment is rotated about a virtual axis which is substantially centered at the output shaft, fitted, and fixed.

10. An electric motor unit comprising
a device attaching fixture which is arranged on projections of the electric motor attachment of the electric motor of claim 6 through buffers inserted on the projections.

11. A blower comprising:
rotor blades which are attached from a distal end side of the output shaft of the electric motor unit of claim 10.

12. An electric device comprising
the blower of claim 11.

13. The electric motor of claim 1,
wherein a material of a core line of the winding wound on the teeth through an insulator is an alloy containing at least copper and aluminum, aluminum containing a minute amount of impurity, or an aluminum alloy.

14. The electric motor of claim 1,
wherein the molding material is thermosetting.

15. The electric motor of claim 1,
wherein the molding material is thermoplastic.

16. An electric motor in which a stator, a connection-line-attached connector of a power supply connecting member, and a control unit component which controls a winding of the stator are attached to a circuit wiring board, and the circuit wiring board, the stator, the connection-line-attached connector of the power supply connecting member, and the control unit component are molded by a molding material, comprising:
the stator including:
a stator core having
a plurality of teeth arranged in a substantially radial pattern,
a yoke for connecting the teeth on a peripheral portion,
teeth end broad portions formed on ends of the teeth,
a slot open formed between the adjacent teeth end broad portions, and
a winding wound on the teeth through an insulator; and
a rotor rotatably held facing an inner circumference of the stator through a small gap and having at least a permanent magnet magnetized to a plurality of poles,
wherein the connection-line-attached connector is configured such that a lead line is connected to a caulking terminal portion on one end side of a terminal of the connection-line-attached connector, and a connection portion between the caulking terminal portion and the lead line is integrally molded by resin,
the terminal has three step portions on the other end side, two step portions of the step portions extend in a direction perpendicular to a terminal direction of the caulking terminal portion, a remaining step portion extends in parallel to the terminal direction of the caulking terminal portion,
a distal end portion of the caulking terminal portion is inserted in a through hole formed in the circuit wiring board,
a terminal portion parallel to the circuit wiring board is soldered to arrange the connection-line-attached connector on a circuit wiring surface side of the circuit wiring board only one surface of which has circuit wiring.

17. The electric motor of claim 16,
wherein an attaching surface side of the connection-line-attached connector is soldered on the circuit wiring board both surfaces of which have circuit wiring.

18. The electric motor of claim 16,
wherein the electric motor has an output shaft support portion unit which supports an output shaft of the electric motor and an electric motor attachment which is arranged and fitted on a projection direction side of the output shaft of the output shaft support portion unit and holds and fixes the electric motor, and the electric motor attachment has a through hole in which the output shaft is inserted, a configuration in which an inner wall surface of the through hole and the output shaft are separated from each other and are not in contact with each other, and a configuration in which a distal end of the output shaft projects from the through hole.

19. The electric motor of claim 18,
wherein the output shaft support portion unit to hold the rotor includes: a bottom cover; a bearing arranged on the bottom cover; an elastic member which presses the bearing; and a lid cover which covers the bottom cover, the bearing, and the elastic member and in which a fitted portion of the bottom cover is press-fitted.

20. The electric motor of claim 19,
wherein the lid cover of the output shaft support portion unit has a flange portion, the flange portion has a notch, an electric motor attachment is inserted from the notch, and the electric motor attachment is rotated about a virtual axis which is substantially centered at the output shaft, fitted, and fixed.

21. The electric motor of claim 19,
wherein the lid cover of the output shaft support portion unit has a flange portion, the flange portion has a notch, an electric motor holding attachment having a columnar projection is inserted from the notch, and the electric motor holding attachment is rotated about a virtual axis which is substantially centered at the output shaft, fitted, and fixed.

22. The electric motor of claim 19,
wherein the lid cover of the output shaft support portion unit has a flange portion, the flange portion has a notch, an electric motor holding attachment having a polygonal columnar projection is inserted from the notch, and the electric motor holding attachment is rotated about a virtual axis which is substantially centered at the output shaft, fitted, and fixed.

23. An electric motor unit comprising
a device attaching fixture which is arranged on projections of the electric motor attachment of the electric motor of claim 19 through buffers inserted on the projections.

24. A blower comprising:
rotor blades which are attached from a distal end side of the output shaft of the electric motor unit of claim 23.

25. An electric device comprising
the blower of claim 24.

26. The electric motor of claim 16,
wherein a material of a core line of the winding wound on the teeth through an insulator is an alloy containing at least copper and aluminum, aluminum containing a minute amount of impurity, or an aluminum alloy.

27. The electric motor of claim 16,
wherein the molding material is thermosetting.

28. The electric motor of claim 16,
wherein the molding material is thermoplastic.

* * * * *